United States Patent
Khoo (10) Patent No.: US 10,769,354 B2
(45) Date of Patent: Sep. 8, 2020

(54) SYSTEM AND METHOD FOR TRIGGERING STATE CHANGES IN CONTENT WITH INITIATION OF MULTI-MEDIA PLAYBACK

(71) Applicant: Justin Khoo, San Francisco, CA (US)

(72) Inventor: Justin Khoo, San Francisco, CA (US)

(*) Notice: Subject to any disclaimer, the term of this patent is extended or adjusted under 35 U.S.C. 154(b) by 0 days.

(21) Appl. No.: 16/282,591

(22) Filed: Feb. 22, 2019

(65) Prior Publication Data

US 2019/0258702 A1 Aug. 22, 2019

Related U.S. Application Data

(60) Provisional application No. 62/633,612, filed on Feb. 22, 2018, provisional application No. 62/638,687, filed on Mar. 5, 2018.

(51) Int. Cl.
| | |
|---|---|
| *G06F 17/00* | (2019.01) |
| *G06F 40/151* | (2020.01) |
| *H04L 12/58* | (2006.01) |
| *G06Q 10/10* | (2012.01) |
| *G06F 40/14* | (2020.01) |
| *G06F 40/106* | (2020.01) |
| *G06F 40/117* | (2020.01) |

(52) U.S. Cl.
CPC .......... *G06F 40/151* (2020.01); *G06F 40/106* (2020.01); *G06F 40/117* (2020.01); *G06F 40/14* (2020.01); *G06Q 10/107* (2013.01); *H04L 51/10* (2013.01); *H04L 51/18* (2013.01)

(58) Field of Classification Search
CPC .... G06F 40/151; G06F 40/117; G06F 40/106; G06F 40/14; H04L 51/10; H04L 51/18
USPC .................................................. 715/203, 716
See application file for complete search history.

(56) References Cited

U.S. PATENT DOCUMENTS

| | | | | |
|---|---|---|---|---|
| 7,865,394 B1* | 1/2011 | Calloway | ............. | G06Q 10/107 370/252 |
| 2002/0057287 A1* | 5/2002 | Crow | ................... | G06F 3/04847 715/716 |
| 2004/0205133 A1* | 10/2004 | Adler | ................... | G06Q 10/107 709/206 |
| 2014/0035855 A1* | 2/2014 | Feldman | ............... | G06F 3/0488 345/173 |
| 2014/0259083 A1* | 9/2014 | Candelore | .......... | H04N 21/4316 725/110 |
| 2016/0203546 A1* | 7/2016 | Budnitz | ............. | G06Q 30/0277 705/27.2 |

OTHER PUBLICATIONS

Guimaraes et al., Synchronizing Web Documents with Style, ACM 2014, pp. 151-158. (Year: 2014).*
Ahmed Bakia, Using the AVKit framework for Media Playback, Springer 2014, pp. 317-342. (Year: 2014).*

* cited by examiner

*Primary Examiner* — Cong-Lac Huynh
(74) *Attorney, Agent, or Firm* — Ellenoff Grossman & Schole LLP; James M. Smedley; Alex Korona

(57) ABSTRACT

The present invention relates to techniques for synchronization of state changes in elements within electronic messages with the playback state of multi-media content. A method and system applying these techniques to tracking, animations, and controlling a display state of elements are disclosed.

17 Claims, 10 Drawing Sheets

SYSTEM AND METHOD FOR TRIGGERING STATE CHANGES IN CONTENT WITH INITIATION OF MULTI-MEDIA PLAYBACK

CROSS REFERENCE TO RELATED APPLICATIONS

This application is a continuation of U.S. Provisional Patent Application No. 62/633,612 filed on Feb. 22, 2018 and U.S. Provisional Patent Application No. 62/638,687 filed on Mar. 5, 2018, the entire disclosure of each and all of the above mentioned references are hereby incorporated herein by reference.

FIELD OF THE INVENTION

The present invention relates generally to the area of multi-media in electronic messages. More specifically techniques for synchronization of state changes in elements within electronic messages with the playback state of multi-media content are disclosed, including illustrative applications to tracking, animations, and controlling display state of elements

BACKGROUND OF THE INVENTION

Electronic messages such as email may contain HTML as well as multi-media content. It would be advantageous to have, for example, an animation start to play together with music when a user presses a play button. However due to the lack of the capability to execute scripts, such as Javascript, within email, there is a lack of means to synchronize an animation and the playback of multi-media content in messages such as those in an email.

It would be useful to have a method to execute animations and changes in states of elements within messages together with an initiation of playback content of multi-media such as an audio file or video.

BRIEF DESCRIPTION OF THE DRAWINGS

Various embodiments of the invention are disclosed in the following detailed description and the accompanying drawings.

DETAILED DESCRIPTION OF THE DRAWINGS

In the description above, the detailed description, the claims below, and in the accompanying drawings, references is made to particular features (including method steps) of the various embodiments of the invention. It is to be understood that the disclosure of the invention in this specification includes all possible combinations of such particular features, for example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments of the present invention can be implemented in a variety of ways, such as a process, an apparatus, a system, a composition of matter, a computer readable medium (for example, a computer readable storage medium), or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention may be described in connection with such embodiments, but the invention is not limited to any particular embodiment or any particular set of such embodiments. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some of the following implementations associate "class" and "id" with elements. It may be appreciated that any combination of class, id or Cascading Style Sheets (CSS) selectors may be used to identify and associate style properties to elements. Although the following relates generally to multi-media content within messages such as email, it may be appreciated that the concepts disclosed herein may be used more broadly within web pages as well without departing from the scope of the present invention.

Figure 1:
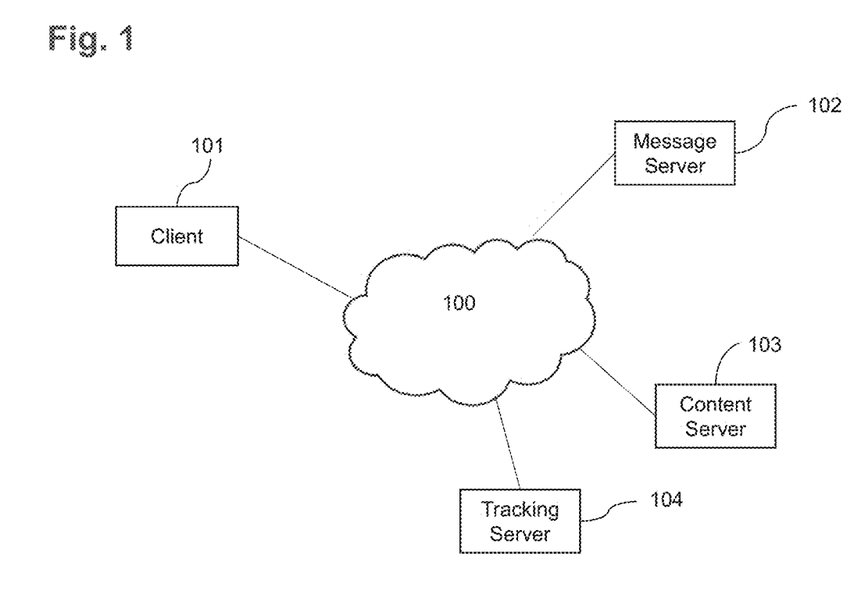
FIG. 1 is a diagram of a system for the retrieval and playback of multi-media and associated content.

FIG. 1 is a diagram of a system for the retrieval and playback of multi-media and associated content. Multi-media content may include, but is not limited to, audio or video and associated content may include web pages, Hypertext Markup Language (HTML) content and images.

In this exemplary embodiment, a client or user device 101 may be connected to a network 100. A client 101 may be any device capable of receiving content, including, but not limited to, devices such as a personal computer, Personal Digital Assistant (PDA), or cell phone.

The network 100 may be any type of network, for example, a public network (such as the internet or a cellular phone network), a private network (such as a home network), or a combination of both.

A client may receive a message from a message server 102. In some embodiments, the message may be an email and the message server may be an email server.

When a message is opened in the client 101, multi-media and associated content may be loaded from a content server 103.

When a user interacts with a message or elements within a message, the actions may cause the client to make network calls to log such interactions on a tracking server 104.

It may be appreciated that the various servers 102, 103, 104 represent logical units and may physically be in disparate locations, may be physically located in a single location or machine, or may be dispersed among multiple locations and multiple machines.

Figure 2A:
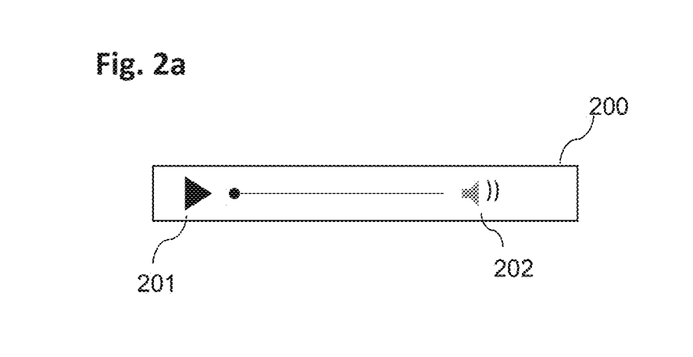
FIGS. 2a and 2b illustrate various multi-media controls.
Figure 2B:
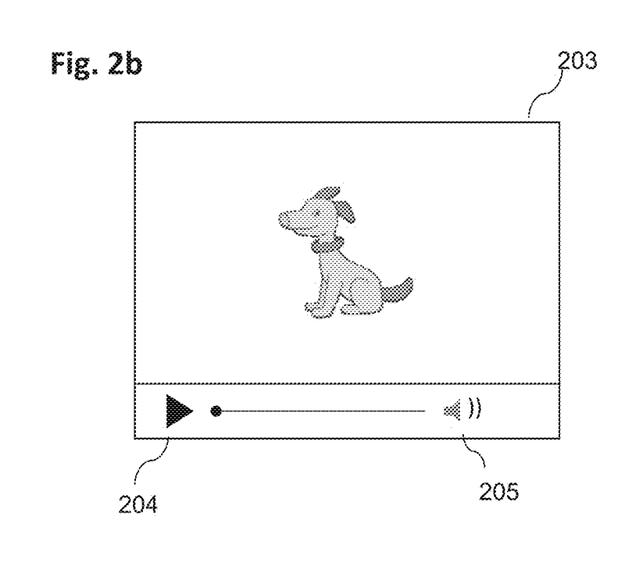

Triggering of State Changes within Associated Elements when Multi-Media Content is Played FIGS. 2a and 2b illustrate examples of multi-media content with associated elements that allow for the playback of the multi-media content. Multi-media content may comprise both audio and video. In the various embodiments, multi-media elements may be comprised of both control elements and content elements. The control elements may comprise user interface elements that control the playback of multi-media content. The content elements may display information relating to said multi-media content, for example video.

In FIG. 2a, an audio control 200 with an audio play button 201 and optional volume toggle 202 may be described herein. In FIG. 2b a video control 203 with a video play button 204 may be described herein.

The embodiments described herein may allow for the simultaneous or near simultaneous triggering of(?) changes in HTML elements when a user initiates the playback of multi-media content by triggering the play button of a multi-media control. A multi-media control may comprise a video or audio control. For example, controls may be user interface elements that expose control elements for a user to control the playback of multi-media content, such as audio or video.

Figure 3A:
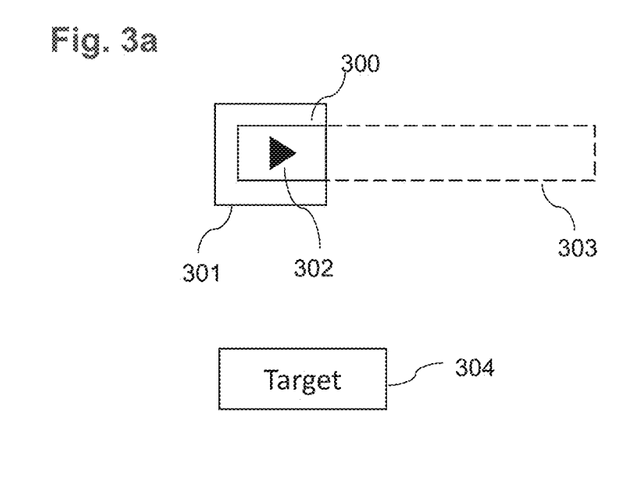
FIG. 3a is an illustration of an audio control being wrapped by an element to obscure the control except for the play button.

FIG. 3a is an illustration of an audio control being wrapped by an element to obscure the control except for the play button.

This embodiment may be realized by obscuring the multi-media control 300 with a wrapper HTML element 301. The wrapper HTML element may comprise a div that is sized and optionally positioned such that only the play button 302 of the multi-media control is un-obscured. The remainder of the multi-media control may be obscured 303 and not accessible to a user. It may be advantageous to also increase the size of the play button 302 to make it easier for users to trigger the button. In a preferred embodiment, the size of the play button may be increased by increasing the "scale" of the audio element using a CSS transform function scale( ). Other methods familiar to those skilled in the art to increase the size of an audio element or the size play button may be used as well. The following is an example of a style declaration that may increase the size of an audio element such that the size of the play button is doubled. The "transform-origin" style set to "top left" may be used to anchor the increase in size of the element to the top left of the element instead of the default which is the center. In certain environments, the width of the element may need to be bounded as well. Therefore, in a preferred embodiment, a media query or CSS at-rule may be used to detect which environment the content is being loaded before applying the CSS transforms and width settings.

```
audio {
    transform-origin:top left;
    transform:scale(2);
}
```

A pseudo-class may then be associated with the wrapper element that, when activated by a user tapping or clicking on the play button 302, may modify the style properties of adjacent elements 304. The pseudo-class used may include, but is not limited to, the "active", "hover", "focus" and "target" pseudo-classes. In CSS parlance, the "active" pseudo-class may be triggered only while an element is being actively triggered, such as by a user click, and stops being triggered when a user releases the click. The "hover" pseudo-class may be triggered only when a cursor is above an element. For touch devices, the "hover" pseudo-class may trigger when a user taps on an element and becomes untriggered when a user taps on another element. The "focus" pseudo-class may be triggered on elements that have a "tabindex" attribute set when a user taps or clicks on an element and becomes untriggered when another element receives focus. Although the various teachings herein focus on the use of a particular pseudo-class it may be appreciated by one skilled in the art that any one of the abovementioned pseudo-class may be used in an analogous manner without departing from the scope of the invention. The changes made to an adjacent element 304 may include, but are not limited to, changing the size (for example, height or width), color, visibility, position, z-index, CSS transformation, and opacity of said target element 304.

The setup in FIG. 3a may be achieved with the following code involving a wrapper element 301, a DIV with a "class" attribute "wrapper1" that wraps a multi-media element, and an audio element 300 with a class attribute "audio1" with playback controls displayed (denoted with the "controls" attribute, followed by a target element 304, in this example a DIV element with a "class" attribute "target1":

```
<div class="wrapper1">
<audio class="audio1" src="http://contentserver.com/music.mp3" controls="true"></audio>
</div>
<div class="target1">Target</div>
```

The following style declaration is an illustrative embodiment of sizing the wrapper 301 element such that only the play button 302 of the audio element may not be obscured. In this example, the play button of the audio element may be 35 pixels wide and 35 pixels high. The overflow style may be set to "hidden" to obscure the rest of the audio element 303 so that a user is not able to click or tap on the area of the audio element outside the play button. The display may be optionally set to a block type, such as "block" or "inline-block" to change any inline or non-block level element, providing the ability to set height and width dimensions.

```
.wrapper1 {
    display:block;
    height:35px;
```

```
width:35px;
overflow:hidden;
}
```

In an exemplary embodiment of synchronizing style changes, when a multi-media element is played, the background color of the target element 304 may change to red when the play button 302 of the audio element 300 is activated (for example, clicked or tapped). This may be done by using a pseudo-class to set a property on a target element 304 when the pseudo-class is triggered.

In an exemplary embodiment, the following style declaration may be associated with a "hover" pseudo-class associated with the "wrapper1" class that is associated with the wrapper element 301. The pseudo-class may trigger when the user hovers the cursor or taps (when using a touch based device) the wrapper element 301 or any element within it. A sibling selector ("~") may be used to target the style changes to the target element 304 following the wrapper element in the document object model (DOM) with the classname "target1".

```
.wrapper1:hover ~ .target1{
    background-color:red;
}
```

Figure 3B:
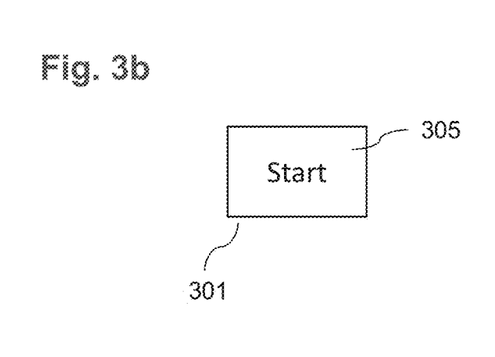
FIG. 3b is an illustration of an audio control having the native play button translucent to expose text underneath.

One of ordinary skill in the art may appreciate that such a technique may be used to display a hidden target element, hide a target element, and/or change its shape or position. Other pseudo-classes, such as "active", may be used as well without departing from the scope of the present invention.
Hiding of the Play Button In certain cases it may be advantageous to hide the native play button 302 of a multi-media element and replace the button with imagery or text such as "Start" or "Play". FIG. 3b is an illustration of an audio control having the native play button translucent to expose text underneath. In this exemplary embodiment, text 305 or imagery may be placed within the wrapper element 30.1 Additionally, the play button 302 may be overlaid on top of the text 305 or imagery with its opacity set to zero (or a low number) such that the play button 302 is no longer visible, has become translucent, or has become transparent but will still play when a user clicks or taps on the button within the wrapper 301.
Temporary Persistence of Style Changes In certain cases it may be advantageous to persist a style change after the commencement of playing of a multi-media element, and then revert the changes after a preset time, such as the time it takes for an audio or video to finish playing. The style change, for example, may include, but is not limited to, temporarily displaying hidden elements.

In exemplary embodiments, temporarily persisting elements may be achieved using the transition delay style property. For example, in the following code there may be a hidden target element with the class "target1" that has an opacity style setting the opacity to a low value, such as, 0 making the text within it, "Target", invisible.

```
<div class="wrapper1">
    <audio class="audio1" src="http://contentserver.com/music.mp3" controls="true"></audio>
</div>
<div class="target1" style="">Target</div>
```

In order to delay transitions between properties, a transition delay style may be used on the target element, for example, 2 seconds:

```
.target1{
    transition-delay: 2s;
    opacity:0;
}
```

In exemplary embodiments, in order to make the changes immediate on activation of a pseudo-class when a user activates the play button, the transition delay of the target element may be set to zero or a value lower than the initial transition delay value. The following example may use the "active" pseudo-class associated with the wrapper element to display the target element by increasing the opacity (for example, setting the opacity to 1) when the pseudo-class is activated:

```
.wrapper1:active ~ .target1{
    transition-delay: 0s;
    opacity:1;
}
```

The target element may stay displayed as long as the element associated it is triggered, for example, clicked or tapped. With the transition-delay style set to 0, when the pseudo-class is activated, the style change on target may take effect immediately. However, when the pseudo-class is no longer triggered, the style change on the target element may persist for the original transition delay value of 2s according to this embodiment. It may be appreciated that other style values may be used in place of opacity including but not limited to width, height, color, z-index, CSS transform and position.
Using Form Elements for Greater Layout Flexibility.

Tying a pseudo-class to a wrapper element may necessitate that the target element reside below the wrapper element in a DOM. To allow greater layout flexibility, in exemplary embodiments, an intermediary form element may be used as an intermediary wherein the wrapper wrapping a play button in a multi-media element consists of a label element with the "for" attribute targeting the "id" of a form element such as a checkbox or radio button. A pseudo-class, such as "active" or "checked", may then be associated with the form element, making the form element a proxy. Wherein, when a user action on a play button causes the wrapping label to trigger a pseudo-class associated with a form element, it may alter the style properties of a sibling target element. In a preferred embodiment, the intermediary form element may be hidden.

In the following example, the wrapper element being a label element with a "for" attribute may be targeting the checkbox input with the "id" "checkbox1":

```
<div>
    <label class="wrapper1" for="checkbox1">
        <audio class="audio1" src="http://contentserver.com/music.mp3" controls="true"></audio>
    </label>
</div>
<input id="checkbox1" type="checkbox" style="display:none;">
<div class="target1" style="">Target</div>
```

According to an exemplary embodiment, the style below may demonstrate the wrapper with the class "wrapper1" being sized to only display the play button as well as a pseudo-class attached to the checkbox with the id "checkbox1" triggering changes to styles in the target element with the class "target1":

```
.wrapper1 {
  display:block;
  height:35px;
  width:35px;
  overflow:hidden;
}
#checkbox1:active ~ .target1{
  transition-delay: 0s;
  opacity:1;
}
```

In a preferred embodiment, the wrapper element itself may be translucent (opacity 0) to allow it to be incorporated into a larger parent element containing imagery or text that is too large to fit within the dimensions of the wrapper element.

Synchronizing Animation Start with Playing of Multi-Media Content

It may be advantageous to start an animation simultaneously with the start of the playing of a multi-media content in a page containing HTML such as in an email message. In a preferred embodiment, this may be achieved with a combination of a pseudo-class targeting one or more hidden elements containing or consisting of animated elements whereby, when the pseudo-class is triggered, the hidden elements are displayed and, optionally, the animations of the animated elements are restarted.

Figure 4A:
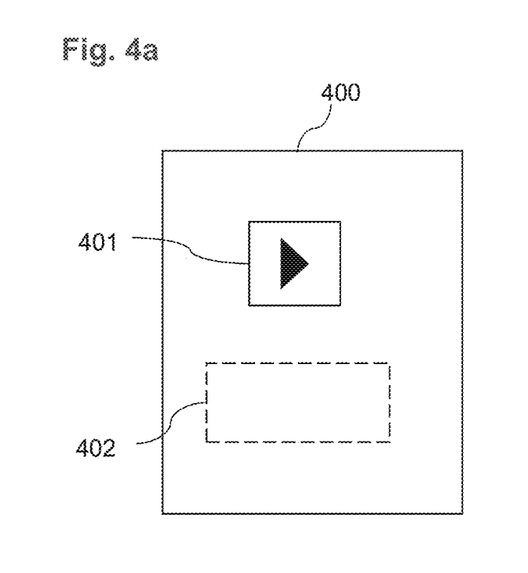
FIGS. 4a and 4b illustrate activation of playback on a multi-media element causing an associated element to display and start or restart an animation.
Figure 4B:
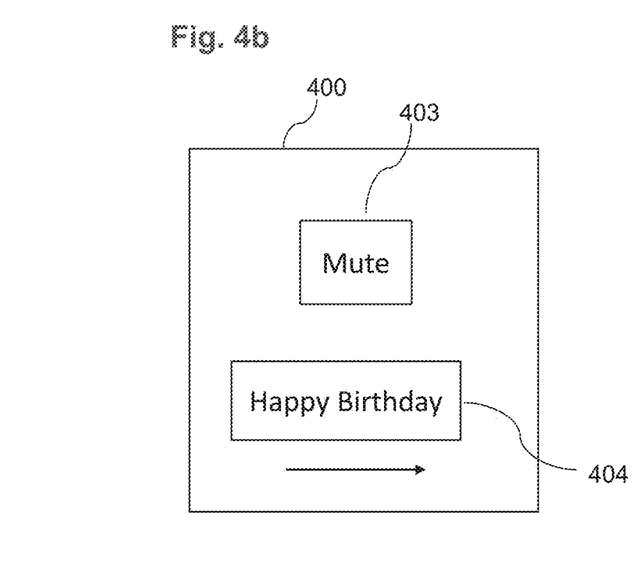

FIGS. 4a and 4b illustrate activation of playback on a multi-media element causing an associated element to display and start or restart an animation.

In the following example, illustrated in FIG. 4a, an animated element 402 with the class "animated1" may be initially hidden with opacity set to 0. Therefore, even though the element is being animated, the element having the animation named "anim1" associated with the style and the animation defined by a @keyframe declaration moves the element containing the text "Happy Birthday" towards the right (using left margin). The animated element may also have a preset transition delay, in this example 5 seconds, to ensure that when the user is no longer triggering the play button, the element remains visible for a period long enough for it to complete the animation. In an alternative embodiment, the preset transition delay may be long enough for the element to remain visible long after the animation has completed.

When a user actions on the play button 401 of the audio control, the wrapper1 pseudo-class may be triggered. The wrapper1 pseudo-class may set the opacity value of the animated element 402 (animated1) to 1 making the element 404 visible as illustrated in FIG. 4b. By setting the transition delay to zero, this action may happen immediately. By setting the animation name style to "none" briefly, the animation of the animated element 404 may also "restart" once the pseudo-class is no longer triggered. Since the animated element has a preset transition delay, once the pseudo-class is no longer triggered, the animated element may continue to be visible for the duration of the transition delay. Therefore, it may appear to a user that by tapping or clicking on the play button 401, the animated element is caused to appear and begin animating.

```
<div class="wrapper1">
<audio src="http://contentserver.com/
music.mp3" controls="true"></audio>
</div>
<div class="animated1">Happy Birthday</div>
```

The following are the style properties of an exemplary embodiment disclosed herein:

```
.wrapper1{
  display:block;
  height:35px;
  width:35px;
  overflow:hidden;
}
.animated1{
  opacity:0;
  transition-delay: 5s;
  animation: anim1 5s;
}
.wrapper1:active ~ .animated1{
  opacity:1;
  transition-delay: 0s;
  animation-name:none;
}
@keyframes anim1{
  from{
    margin-left:0px;
  }
  to{
    margin-left:100px;
  }
}
```

One of ordinary skill in the art may also appreciate other methods to hide and display elements, for example, (i) reducing the width, height, max-width or max-height of an element to zero to hide an element and (ii) setting them to a larger number to make the element visible. Other methods may also be employed to hide or display elements, for example, positioning the element outside the viewport, decreasing the z-index of an element, or rotating the plane of an element in order to hide it, and changing the positioning of an element back into the viewport, rotating the plane, or increasing the element's z-index in order to display it.

Other methods to restart and start animations may be employed as well. In other embodiments, the animated element may be a container within a container that is originally hidden and displayed when a pseudo-class is triggered by the play button of a multi-media element to display the container. In other words, instead of or in addition to, having the hidden container be animated, content within the container may also be animated.

Another embodiment may be implemented by utilizing a label as the wrapper of the play button 401, targeting a form element using the "for" attribute, and associating the pseudo-classes to the intermediate (proxy) form elements to trigger style and animation changes of the animated element 402/404.

Another preferred embodiment may make the native play button translucent to display alternative text or image below it. An additional preferred embodiment may change the text or image once the play button is activated using a pseudo-class to display a different text or image within the wrapper such as "Mute" 403 or "Stop".

Multiple Concurrent Playback of Audio Elements.

It may be appreciated that in certain cases such as simulating an instrument with, for example, virtual piano keys, the ability to play the same tune multiple times before a tune has finished playing is advantageous, allowing for quick successive and concurrent playback of a tune at a single location. Normally, if there is only one audio element, clicking on a play button while the audio element is already playing may have the effect of pausing, stopping, or restarting the audio playback.

Figure 5:
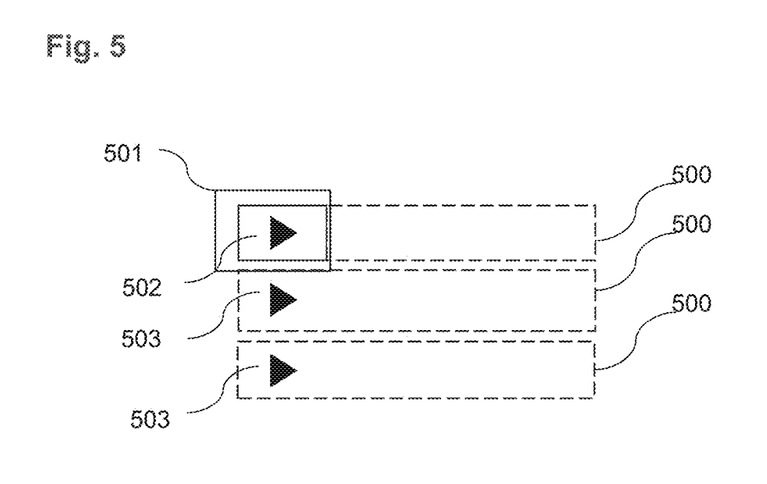
FIG. 5 is an illustration of a stacking of multiple audio controls within a master wrapper.

FIG. 5 is an illustration of a stacking of multiple audio controls within a master wrapper. To mimic the ability to play a tune multiple times in a preferred embodiment illustrated in FIG. 5, multiple elements of the same audio tune 500 may be stacked on top of each other, with each audio element containing a wrapper and all of the elements being inside a master wrapper element 501 that only displays one play button 502.

In this embodiment, when a play button 502 is clicked or tapped, an "active" or "hover" pseudo-class associated with its wrapper may set its height style to 0 to hide the recently played button exposing the next unplayed button 503. Using the temporary persistent technique described above to hide the recently played button for the duration of the tune, the recently played button may be displayed after the tune completes. While the first played tune is still playing and the first button being hidden, a user may be able to click on the next button 503, which is visible within the master wrapper element. This may allow the simultaneous playback of multiple tunes concurrently when the user clicks or taps multiple times on a same location within a master wrapper 501.

Figure 6:
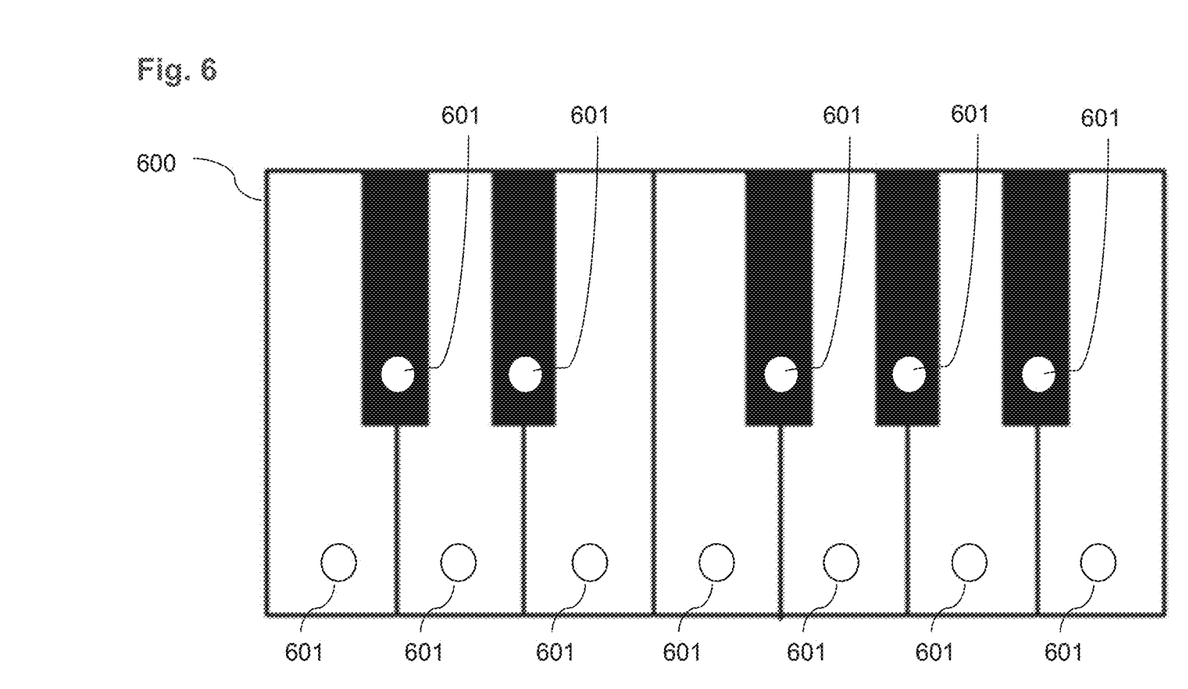
FIG. 6 is an illustration of piano keys with audio controls positioned onto specific positions in a piano key.

FIG. 6 shows a set of piano keys 600 with each key having an active area where a user may tap or click 601. In the preferred embodiment, the active area 601 may contain multiple audio elements, set up as shown in FIG. 5, to allow a user to play a key multiple times concurrently.

Alternatively, when an audio element is playing and is not hidden a user may click on it to pause. However, there is no straightforward way to restart the audio from within a wrapper. In the preferred alternate embodiment, multiple similar audio controls may be stacked within a wrapper that exposes only one audio control. When the audio is paused (it may be tapped or clicked twice, once to play and once to pause), the element may then be hidden so that the next audio element is displayed and if a user clicks or taps on the newly displayed audio element, it may start playing giving the impression of a tune "restarting".

Synchronizing Element Changes with Playback of Video.

Figure 7:
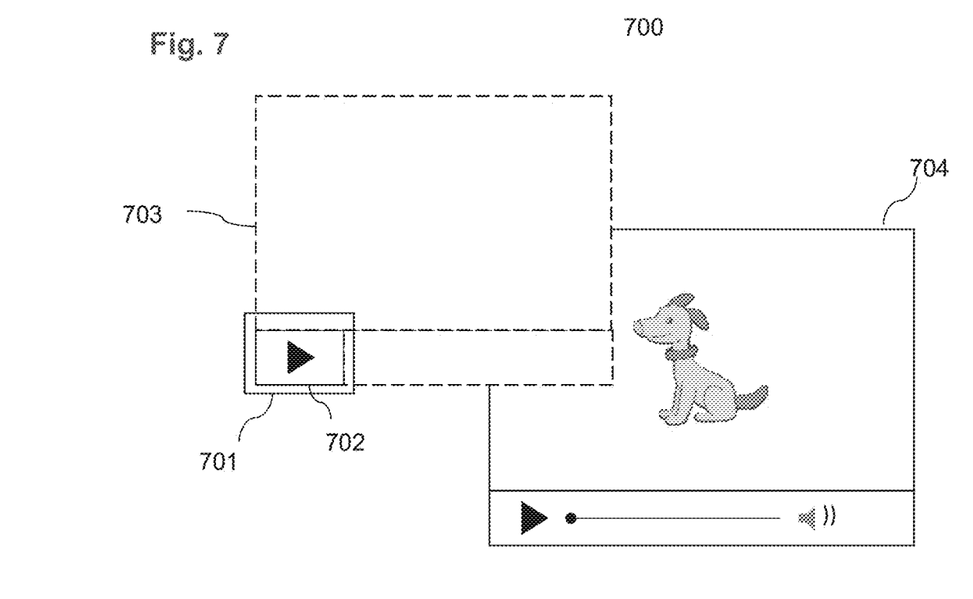
FIG. 7 is an illustration of a video control being wrapped by an element to obscure the control except for the play button with a second video control displayed underneath.

FIG. 7 is an illustration of a video control being wrapped by an element to obscure the control except for the play button with a second video control displayed underneath. In the preferred embodiment 700, the synchronization of element changes may be done in a video 703. This may be achieved by wrapping a wrapper element 701 around a video element exposing only the play button 702. Additionally, the video element 703 may be positioned on a second video element 704, or an image depicting a video element, so that it may appear that the video content 703 is not obscured, even though the remainder of the video element within the wrapper is obscured.

In this embodiment, when a user clicks on the play button 702, a pseudo-class associated with the wrapper 701 may change the dimension of the wrapper to match the size of the video so that the playback of the video may be seen and obscure the second 704 video element. Simultaneously, the pseudo-class may also target the style of a sibling element, allowing it to change the style attributes including changing the background image of the element.

Tracking of Playback of Multi-Media Content

In a preferred embodiment, a pseudo-class may be associated with a wrapper element that is sized to substantially match the size of a play button of a multi-media element. The pseudo-class may cause a background image to be displayed when the play button is activated. The background image may be received from a tracking server 104. The URL of the background image may also include an identifier that is associated with the multi-media element. Then, the remote server may receive the request and the identifier may be identified and stored. The identifier may then be used to show the number of times the multi-media content has been played.

CSS and HTML Changes to Accommodate Multi-Media Playback

Currently, multi-media playback are not controllable via CSS. However, in an exemplary embodiment, an application supporting CSS and HTML may be modified to support the playback of multi-media content such as HTML5 native multi-media content through multi-media specific CSS properties. The implementation of the following modifications to CSS and HTML, as well as other analogous implementations, may become clear to a person of ordinary skill in the art with the explanation and examples below.

Media-Play-State

According to an exemplary embodiment, a new "media-play-state" CSS property may support three states, "playing", "paused" and "stopped". Applying a style of media-play-state may allow the state of another element to influence the playback state of a multi-media element. The example below may illustrate how hovering over an element can start the playback of an audio element with the class "audio2". In this embodiment, when a user hovers over the DIV with the class "start", a sibling selector (~) may target the adjacent audio element and set the multi-media-play-state to "playing" which will start the playback:

```
<div class="start">Start</div>
<audio class="audio2" src=http://contentserver.com/
music.mp3 controls="true"></audio>
<style>
.start:hover ~ audio.audio2{
  media-play-state:playing;
}
```

Conversely, in alternative embodiments, multi-media elements may be coded to respond to new pseudo-classes, such as, the playback states of multi-media elements, so that they may be used to influence the states of other elements directly.

Media-Playing

In some other embodiments, a "media-playing" pseudo-class may be used to influence an adjacent element to a multi-media element. The following example, according to one such embodiment, shows that when the audio element with the class "audio3" starts playing, it may cause the "media-playing" pseudo-class to become activated. This example style may target the adjacent initially hidden element with the class "started" using a sibling selector (~) once the "media-playing" pseudo-class becomes activated, displaying the initially hidden element with the class "started" and the text "I am playing" becomes displayed:

```
<audio class="audio3" src=http://contentserver.com/
music.mp3 controls="true"></audio>
<div class="started">I am playing</div>
```

```
<style>
.started{
  display:none;
}
audio.audio3:media-playing ~ .started{
  display:block;
}
</style>
```

Like the label element that acts as a proxy to form elements, other controls may be made to act as playback and state proxies for audio elements, as well in the various embodiments described herein. For example, a new element "medialabel" may contain an attribute "playcontrol" that refers to an id of multi-media element "audio4." When a user clicks or taps on the medialabel element, the playback may start on the associated multi-media element in accordance with another embodiment:

```
<medialabel playcontrol="audio4">Start</medialabel>
<audio id="audio4" src=http://contentserver.com/
music.mp3 controls="true"></audio>
```

Alternatively, the proxy specifier may be reversed and put on the multi-media element instead. The following example may add a new attribute "playproxy" that refers to an id of another element with the id "control1" where the action of the element with the id "control1" will begin playback of the multi-media content:

```
<div id="control1">Start</div>
<audio playproxy="control1" src=http://contentserver.com/
music.mp3 controls="true"></audio>
```

Figure 8A:
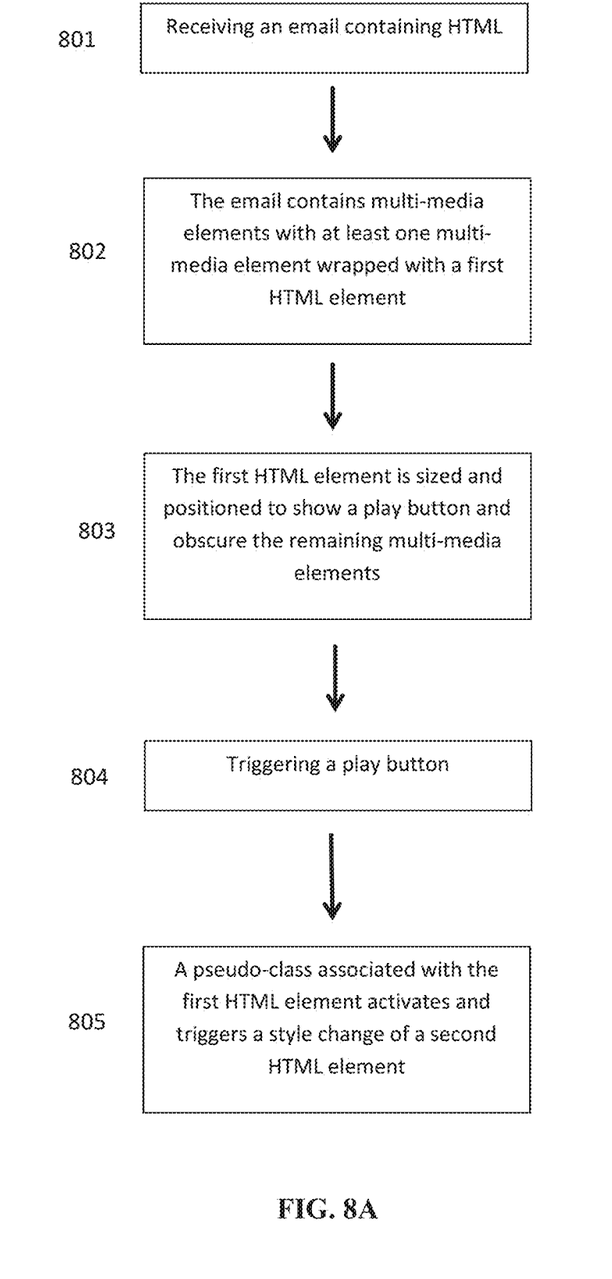
FIG. 8A is a first example method of synchronizing content state change.

FIG. 8A is a first example method of synchronizing content state change. In FIG. 8A, a user may receive an email containing HTML 801. The email may contain multi-media elements with at least one multi-media element wrapped with a first HTML element 802. The first HTML element may be sized and positioned to show a play button and obscure the remaining multi-media elements 803. The user may then trigger a play button 804. The pseudo-class associated with the first HTML element may activate and trigger a style change of a second HTML element 805.

Figure 8B:
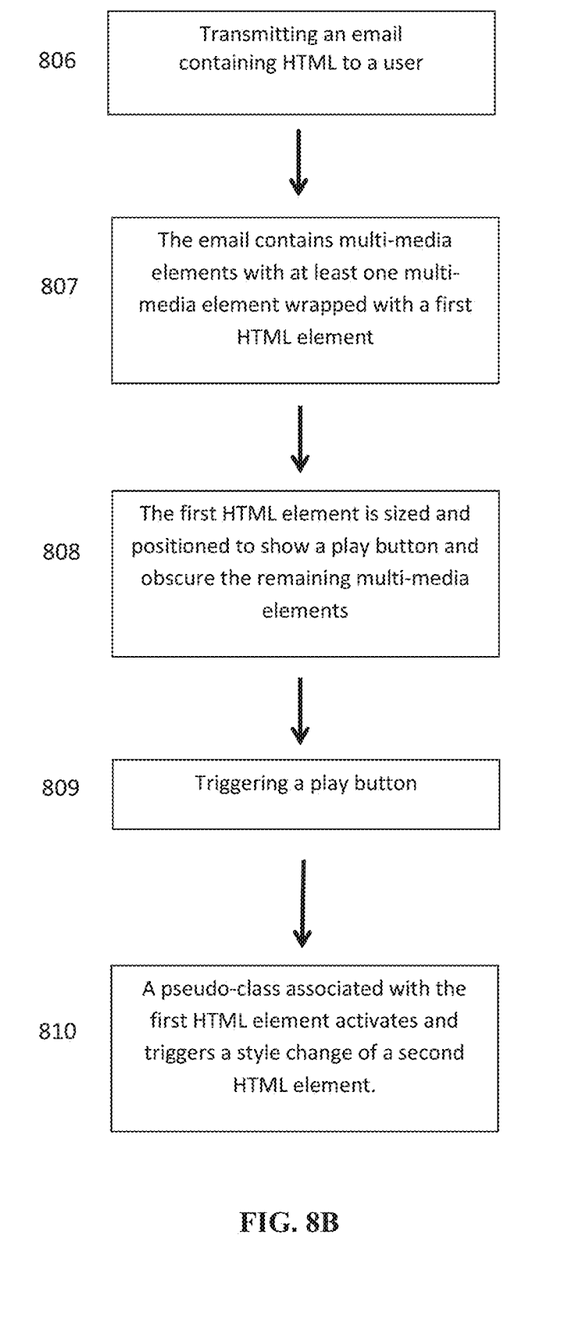
FIG. 8B is a second example method of synchronizing content state change.

FIG. 8B is a second example method of synchronizing content state change. In FIG. 8B, a server, for example, an email server, may transmit an email containing HTML to a user 806. The email may contain multi-media elements with at least one multi-media element wrapped with a first HTML element 807. The first HTML element may be sized and positioned to show a play button and obscure the remaining multi-media elements 808. The user may then trigger a play button 809. The pseudo-class associated with the first HTML element may activate and trigger a style change of a second HTML element 810.

Figure 9:
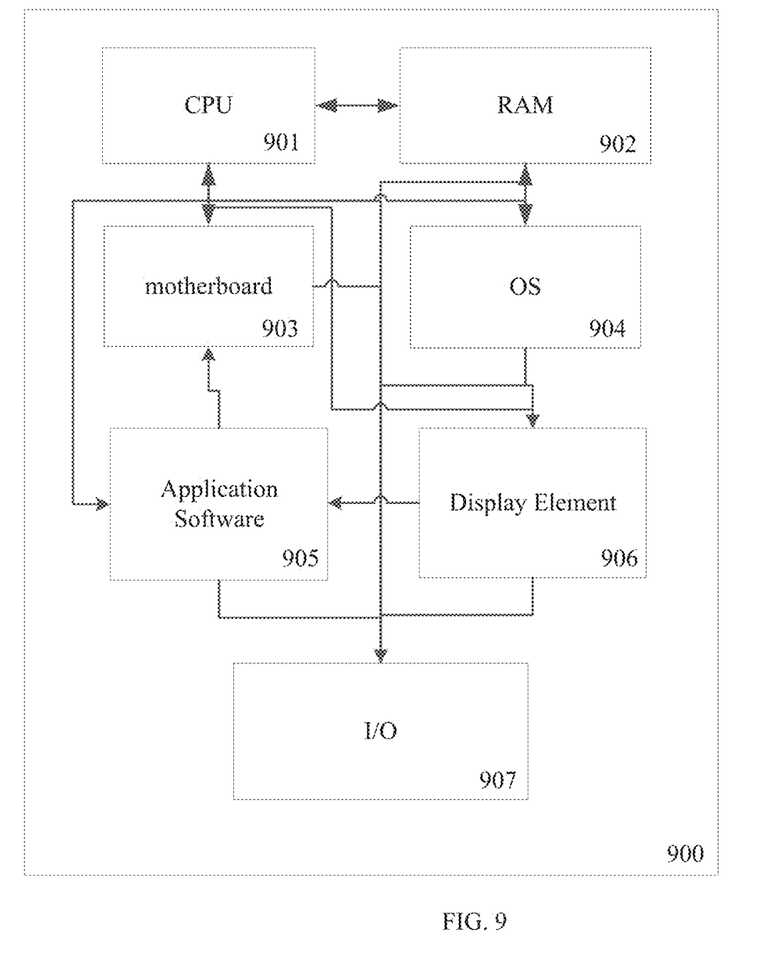
FIG. 9 illustrates a schematic overview of a computing device, in accordance with an embodiment of the present invention.

FIG. 9 illustrates a schematic overview of a computing device, in accordance with an embodiment of the present invention. The system and method described herein may be accomplished through the use of one or more computing devices. As shown in FIG. 9, one of ordinary skill in the art would appreciate that a computing device 900 appropriate for use with embodiments of the present application may generally be comprised of one or more of a Central processing Unit (CPU) 901, Random Access Memory (RAM) 902, a storage medium (e.g., hard disk drive, solid state drive, flash memory, cloud storage) 903, an operating system (OS) 904, one or more application software 905, one or more display elements 906 and one or more input/output devices/means 907. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

It should be understood that as disclosed and discussed herein, instances of invisible, hidden or transparent elements, may include cases or instances of the elements in a semi-visible or transparent states (i.e. not fully transparent states).

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claims. It is intended that broader claims will be submitted in an application that claims the benefit of priority from this application.

The invention claimed is:

1. A method for synchronizing content state change, the method comprising:
    transmitting an email to a user, by an email server, the email containing Hypertext Markup Language (HTML);
    wherein the email contains at least one multi-media element that is wrapped with a first HTML element, the first HTML element is sized to position a play button of the at least one multi-media element within a boundary of said first HTML element and obscure a remainder of the at least one multi-media element; and
    on a condition that the user triggers the play button, activating and triggering a style change of a second HTML element by the pseudo-class associated with the first HTML element.

2. The method of claim 1 where text or imagery is positioned under said multi-media element, reducing opacity of said multi-media element such that said text or imagery is visible through said multi-media element.

3. The method of claim 1 wherein said second HTML element has an associated animation style; said triggering of said pseudo-class causes the animation of said second HTML element to restart.

4. The method of claim 1 wherein said pseudo-class comprises an "active" pseudo-class.

5. The method of claim 4 wherein said style change of said second HTML element comprises setting a background image style, wherein image of said background image is loaded from a remote server wherein said URL of said image comprises an identifier related to said multi-media element.

6. The method of claim 5 wherein said identifier is used by said remote server to increment a count of the number of times said background image has been retrieved.

7. The method of claim 4 wherein said at least one second HTML element style change reverts to the original style a predetermined duration after said "active" pseudo-class is no longer activated, said predetermined duration being specified in a CSS transition delay style.

8. The method of claim 4 where the multi-media element is scaled to increase the size of the play element.

9. A method for synchronizing content state change, the method comprising:
    receiving, by a user, an email containing Hypertext Markup Language (HTML);
    wherein the email contains at least one multi-media element that is wrapped with a first HTML element, the first HTML element is sized to position a play button of the at least one multi-media element within a boundary of said first HTML element and obscure a remainder of the at least one multi-media element; and
    triggering, by the user, the play button;
    wherein a pseudo-class associated with the first HTML element activates and triggers a style change of a second HTML element.

10. The method of claim 9 where text or imagery is positioned under said multi-media element, reducing opacity of said multi-media element such that said text or imagery is visible through said multi-media element.

11. The method of claim 9 wherein said second HTML element has an associated animation style; said triggering of said pseudo-class causes the animation of said second HTML element to restart.

12. The method of claim 9 wherein said pseudo-class comprises an "active" pseudo-class.

13. The method of claim 12 wherein said style change of said second HTML element comprises setting a background image style, wherein image of said background image is loaded from a remote server wherein said URL of said image comprises an identifier related to said multi-media element.

14. The method of claim 13 wherein said identifier is used by said remote server to increment a count of the number of times said background image has been retrieved.

15. The method of claim 12 wherein said at least one second HTML element style change reverts to the original style a predetermined duration after said "active" pseudo-class is no longer activated, said predetermined duration being specified in a CSS transition delay style.

16. The method of claim 12 where the multi-media element is scaled to increase the size of the play element.

17. A system for synchronizing content state change, the system comprising:
    a transmitter configured to transmit an email to a user, wherein the email contains Hypertext Markup Language (HTML);
    wherein the email contains at least one multi-media element that is wrapped with a first HTML element, the first HTML element is sized to position a play button of the at least one multi-media element within a boundary of said first HTML element and obscure a remainder of the at least one multi-media element; and
    a processor configured to activate and trigger a style change of a second HTML element by the pseudo-class associated with the first HTML element on a condition that the user triggers the play button.

* * * * *